United States Patent [19]

Heinrich et al.

[11] 4,107,042
[45] Aug. 15, 1978

[54] FILTER PRESS WITH SPRAY WASHING MEANS

[76] Inventors: Hans Jüergen Heinrich, Wilhelmshoeher Str., 129, Ennepetal; Karl August Rademacher, Hatzfelder Str. 33; Helmut Strohn, Helmutstr. 12, both of Wuppertal; Friedhelm Kramer, Unterm Hunnebrink 1, Attendorn-Neuenhof, all of Fed. Rep. of Germany

[21] Appl. No.: 806,331

[22] Filed: Jun. 14, 1977

[30] Foreign Application Priority Data

Jun. 19, 1976 [DE] Fed. Rep. of Germany ....... 2627578

[51] Int. Cl.² .................... B01D 25/12; B08B 3/02
[52] U.S. Cl. .................... 210/225; 134/172; 210/231
[58] Field of Search .............. 100/112; 134/172, 181, 134/199; 210/224–231

[56] References Cited

U.S. PATENT DOCUMENTS

| 243,265 | 6/1881 | Hyatt | 210/225 X |
| 924,131 | 6/1909 | Behrend | 210/230 X |
| 2,136,200 | 11/1938 | Weisser | 210/227 |
| 3,486,624 | 12/1969 | Sykes | 210/225 |
| 3,637,082 | 1/1972 | Bentzien | 210/225 |
| 3,726,293 | 4/1973 | Padek | 134/172 X |
| 3,780,747 | 12/1973 | Stadie et al. | 134/172 X |

FOREIGN PATENT DOCUMENTS

| 645,657 | 7/1962 | Canada | 210/228 |
| 469,478 | 4/1969 | Switzerland | 134/181 |

*Primary Examiner*—Thomas G. Wyse
*Assistant Examiner*—Robert H. Spitzer

[57] ABSTRACT

A filter press with a novel spray washing arrangement for the filter plates which plates are shiftable on horizontal guides. The novel spray washing means comprises a carrier frame encompassing the stack of plates together with the horizontal guides and a spray pipe. The carrier frame is movable along the stack of filter plates at vertical, lateral struts. The spray pipe is equipped with spray nozzle and is guided as a unit movably up and down along the vertical struts. The spray pipe comprises two branch lines enclosing between them a filter plate that is to be spray washed. The spray nozzles of the two branch lines face each other to provide the same pressure on front and back surfaces of the filter plate.

3 Claims, 6 Drawing Figures

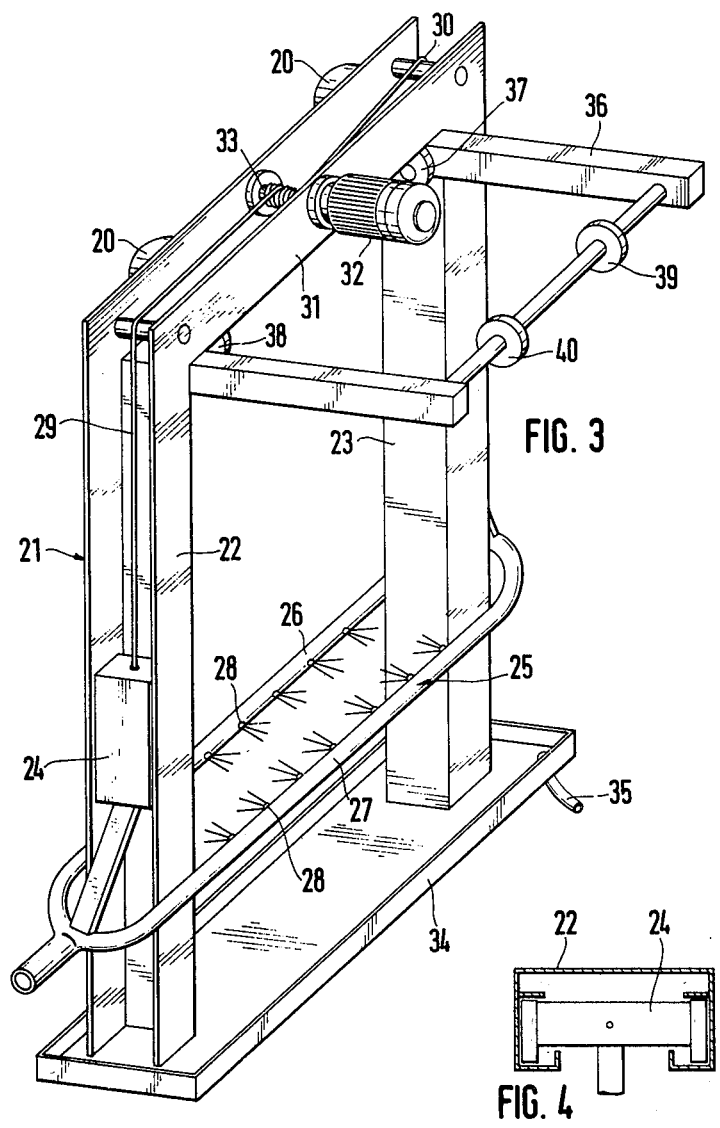

FILTER PRESS WITH SPRAY WASHING MEANS

BACKGROUND OF THE INVENTION (a) Field of the Invention

The invention relates to a filter press with a spray washing arrangement for the filter plates shiftable in a stack on horizontal guides, in which the spray washing arrangement has a carrying frame movable along the stack of filter plates and enclosing the stack of plates together with the guides, on the vertical, lateral struts of which a sparying pipe equipped with spray nozzles is guided and movable up and down.

(b) Description of the Prior Art

In the case of the known filter presses provided with a spray washing arrangement, the filter plates are spray washed in succession once on their one main surface and then on their other main surface under substantial pressure. The generally considerable spray pressure is exerted only on one side on the filter plate and does not shift away the plate because there is required a rear support of the filter plate to prevent shifting. Since such plates must be made in such a way that they may be swiveled behind the filter plate and again be swiveled away from it, they call for a considerable expenditure of producton time and cost. Since the supports moreover engage at the filter cloth, the danger of damage to the filter cloth at the support exists. Beyond that, the known spray washing means are not provided with an apparatus catching the spray water and they could hardly be provided also with a fully effective water catching apparatus especially in view of the ruptures or punctures of the filter plates. Precisely in the case of filter presses which eject their filter cake into a bunker located below it, the running in of spraying water into the bunker must be prevented for which purpose hitherto the bunker had been provided with a covering during the spraying process.

SUMMARY OF THE INVENTION

The invention is based on the task of equipping a filter press with spray washing means which require no mechanical support of the filter plate during the spray washing process and which may be equipped with an apparatus for catching the spray water. For the solution of this task, provision has been made according to the invention that the spray pipe comprises two branch lines enclosing the filter plate that is to be spray washed between them, the spraying nozzles of which face each other.

As a result of the new spray pipe construction of the invention, a number of advantages will be achieved. Since in the case of the invention, the filter plate is spray washed simultaneously on both sides, the spray pressures exerted to the two sides of the plates compensate each other, and a hydraulic field of force stabilizing the position of the filter plate is created, so that any mechanical counter supports engaging at the filter cloths are unnecessary. Since the two branch lines equipped with spray nozzles are developed mirror symmetrically equal, the automatic stabilizing position of the plate is always maintained independently of the spray pressure so that it will be possible to operate with high spray pressures merely dependent on the load capacity of the filter cloths. A further advantage consists in the fact that the main volume of the spray water now runs off at both sides of the plate so that this water may be caught by a relatively narrow bunker (trough). For this purpose and according to a further characteristic of the invention, the underside of the supporting frame is developed as a catch bunker for the spray water which supplements the carrying frame into a stable rectangular support and which advantageously has a slope (gradient) toward one end and which there leads with a drain into a draining trough disposed beside the filter press.

According to a further characteristic of the invention, provision may be made that the branch lines always carry an essentially vertical baffle, f. ex. a protective metal sheet, being in alignment with the ruptures of the filter plates. These baffles always catch the water spraying from the opposite side through the ruptures of the filter plates and guide it into the receiving trough.

Effectively, the baffles are always mounted as a balance (counterpoise) on the branch lines and are swivelable with their lower edges provided with a lifting curvature toward each other up to about a horizontal position. As a result of this, it will be possible to dispose the catch bunker for the spray water close to below the lower edge of the filter plate, since now the baffles upon a downward movement of the spray pipe branch lines fit themselves flatly into the catch bunker, so that the filter plate and the spray washing means may be moved past each other.

The arrangement of the catch bunker and of the balancelike baffles thus requires only a slight distance between the lower edge of the filter plates and the bottom of the place of ejection or the lower parts of the frame of the filter press, so that the height of construction of customary filter presses does not need to be exceeded.

According to a special development of the invention, the lateral struts of the carrying frame have a box or C profile open to the outside and in the lateral struts supports for the spray pipes are guided which may be moved up and down by a driving motor mounted on the upper strut of the carrying frame.

BRIEF DESCRIPTION OF THE DRAWING

The filter press according to the invention will be described in more detail in the following paragraphs on the basis of an embodiment shown in the drawing by way of example.

FIG. 3 shows a simplified perspective presentation of the spray washing means;

FIG. 4 shows a cut according to the line IV—IV in FIG. 2;

DESCRIPTION OF THE PREFERRED EMBODIMENT

The filter press has two vertical posts 1 and 2 on which two parallel I-guide carriers 3 and 4 disposed at a distance from one another, rest and which on the bottom side are interconnected by two parallel drawn struts 5, 6.

Figure 1:
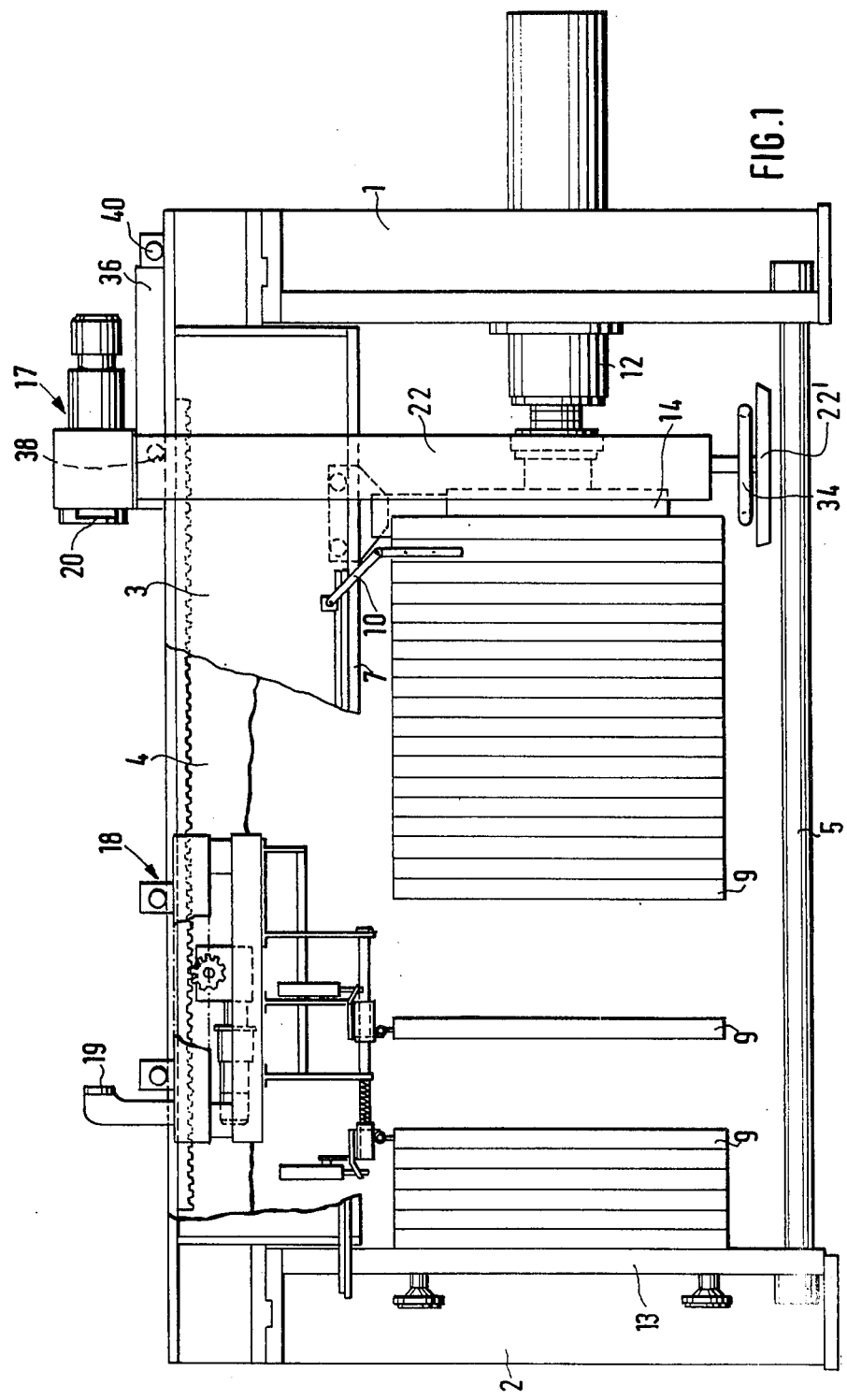
FIG. 1 shows a side view, partly broken away, of a filter press with a spray washing arrangement and a conveying carriage which may be coupled to the spray washing means and which carriage is developed at the same time as a transporting arrangement for the plates.
Figure 2:
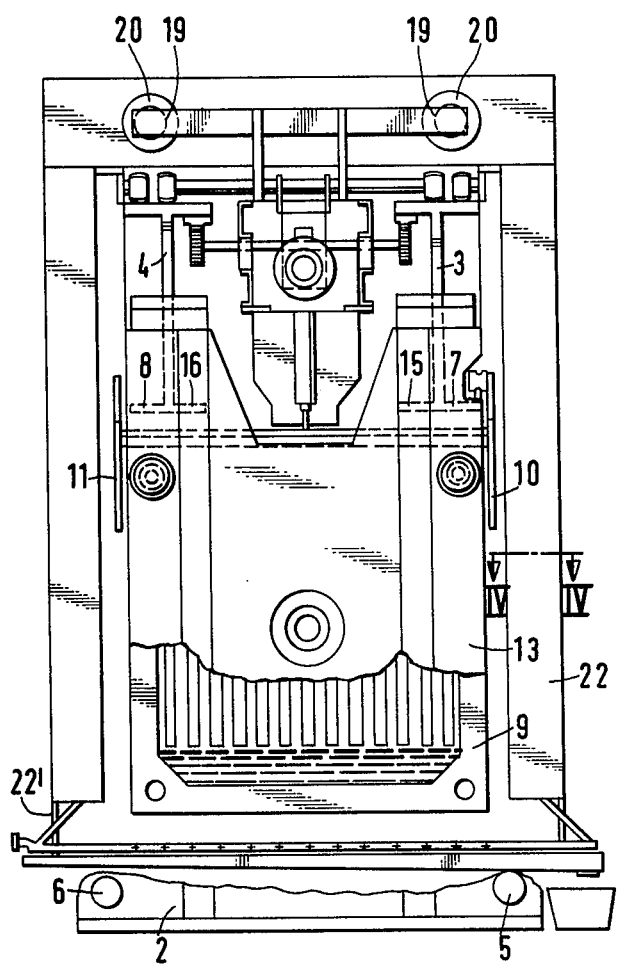
FIG. 2 shows the filter press in FIG. 1 seen from the left.

At the lower outside legs 7, 8 of the I-guiding carriers 3, 4, a multiplicity of filter plates 9 has been suspended shiftably via angular bearer arms 10, 11. While the bearer arms 10 disposed on the front side according to FIG. 1 are bent toward the left, the bearer arms 11 located on the other side are bent to the right and at the same angle. The filter plates 9 are pushed together during the press filtering into a filter plate package by a hydraulic arrangement 12 disposed on the press side, whereby the liquid that is to be filtered, is fed in through the head piece 13 disposed on the post 2 and the filtrate is drained off. The movable headpiece 14 has been mounted movably on the inside lower flanges 15, 16 of the two guide carriers 3, 4.

On the upper flanges of the I-guide carriers 3, 4, a spray washing means 17 for plates and a conveying carriage 18 are mounted movably, which are equipped with the corresponding parts of an electromagnet coupling 19, 20 and which may be coupled and uncoupled with one another. The spray washing means 17, cf. also the schematic presentation according to FIG. 3, has a closed, rectangular carrier frame 21, which encloses the two guide carriers 3, 4 and the filter plates 9. Its lateral struts 22, 23 have a C profile (cf. also FIG. 4) open toward the outside, and in them mounting supports 24 are guided for a spray pipe 25 movable up and down. The spray pipe 25 has two branch lines 26 and 27, enclosing the filter plate 9 which is to be cleaned between them, which lines are equipped with spray nozzles 28 facing each other, so that a filter plate that is to be cleaned, is spray washed simultaneously on both its main surfaces. The mounting supports 24 are always suspended from cables (ropes) 29, 30 which are wound up on a shaft 33 through a driving motor 32 disposed at the upper strut 31 of the carrying frame 21 for the purpose of moving the spray pipe 25 up. In case of a downward movement, the cables 29, 30 unwind under the load of the mounting support 24 developed as a counterweight. While the coupling parts 20 are disposed on the vertical side of the upper strut 31 facing the conveying carriage 18, the driving motor 32 is attached to the vertical side of the upper strut 31 facing away from the conveying carriage 18.

The underside of the carrying frame 21 has been developed as a catch tank 34 for the spray water and it is equipped with a drain 35. Whereas in the case of the embodiment of FIG. 1, the tank 34 is attached by narrower connecting elements 22' at the lower ends of the lateral struts 22, 23, in case of the schematic drawing according to FIG. 3, the tank 34 is attached directly to the lower ends of the lateral struts 22, 23.

The spray washing means has a four wheel undercarriage which has a U-shaped frame 36 open in the pressing direction, at the front open ends of which the carrier frame 21 has been attached. The frame 36 of the undercarriage bears at its open ends two rollers 37, 38 running on the outside upper flanges of the I guide carrier 3, 4 and at its bottom leg it has two small rollers 39, 40 which run above the bridges of the I carriers 3, 4. Instead of the two small rollers 39 and 40, only one single wide roller may be provided. The frame 36 of the undercarriage 18 in case of coupling absorbs (incorporates) the conveying carriage 18 almost completely between its lateral legs.

Figure 5:
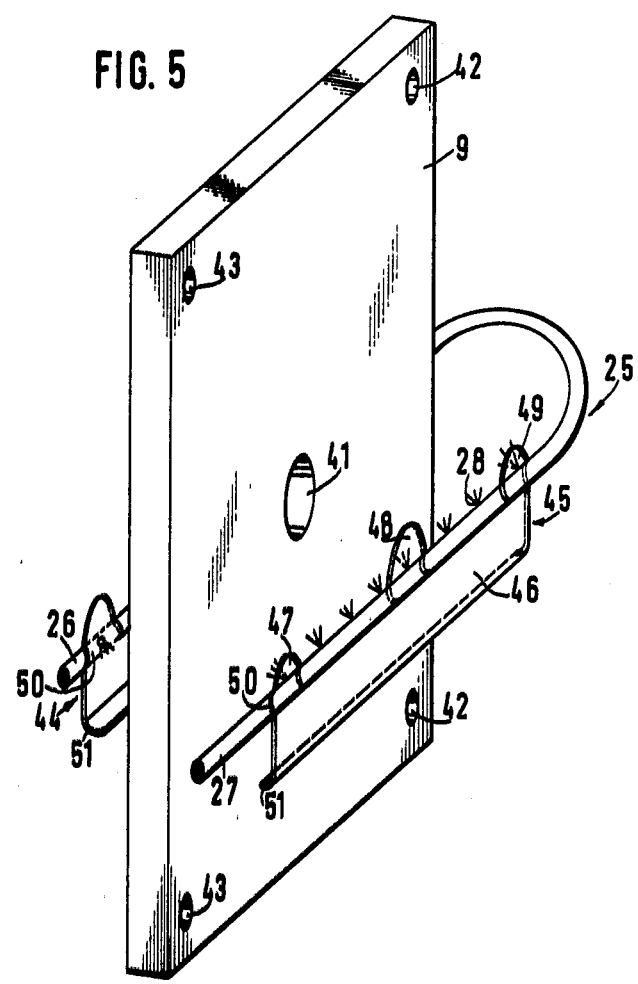
FIG. 5 shows baffles in a perspective presentation which catch water sprayed through the ruptures of filter plates.

FIG. 5 shows a filter plate 9 enclosed between the two branch lines 26, 27 of the spray pipe 25 which is provided in the customary manner with a central puncture 41 and with four punctures 42, 43 for the supply of slurry, for drawing off the filtrate, supply and drainage of the washing water, supply of compressed air, etc. The filter plates are covered with filter cloths that are to be cleaned and are really to be spray washed, which however for the sake of simplification, are not shown in the drawing. In order that the spraying water, coming from the spray nozzle 28, be guided into the catch tank 34 which water had been directed by the spray nozzles 28 through these punctures, the branch lines 26, 27 always carry a baffle 44, 45 lying in alignment with the punctures 41, 42, 43 - with a corresponding position in vertical sense of the spray pipe 25. The baffles may also consist of individual sections always assigned to the punctures 41, 42 or 43 and may be rigidly attached to the branch lines 26, 27.

Figure 6:
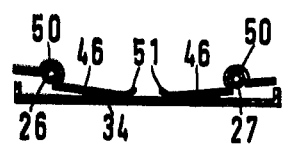
FIG. 6 shows the position of the baffles in the case of a completely lowered spray pipe.

Preferably the baffles 44, 45 however are made of one piece and are mounted swivelably as balances on the branch lines 26, 27. The baffles have a lower continuous apron 46 which carries three upper flaps 47, 48, 49 which are aligned with the punctures. The flaps are bent at their roots as hinge sleeves 50, which enclose the round branch lines 26, 27 by an angle of more than 180°, on the sides facing the plate 9. In the hinge sleeves, suitable enclosing circumferential slits (not shown) are provided for the free reception of spray nozzles 28 always located there. As a result of the relatively great weight of the apron 46, the baffles normally hange perpendicularly. The aprons 46 at their lower edge, are always equipped with a lifting curvature 51 which upon complete moving down of the spray pipe 25, strike the bottom of the catch tank 34 and cause an automatic swiveling of the aprons 46 toward the inside up to an approximately horizontal position (cf. FIG. 6). As is particularly recognizable from FIG. 1, a slight distance between the lower edge of the filter plates 9 and the lower draw struts 5 will be sufficient in order to be able to let the spray washing means 17 and the plates 9 move past each other.

We claim:

1. A spray washing means for washing opposite sides of a filter plate having bores for filtering and for back washing when said plate is taken from a stack of filter plates mounted in a filter press, said means being adapted for washing the plate after filtering, comprising:

a spray pipe formed with a single inlet portion and a loop portion formed of two branched lines which are adapted to enclose a selected filter plate between said two branched lines;

nozzles in said loop portion in each of said two branched lines which face each other for simultaneous spraying opposite lateral surfaces of said filter plate under the same spraying pressure during spray washing by said pipe with water;

a carrier frame including generally vertical struts on which said spray pipe is mounted, said carrier frame being shiftable in a horizontal direction along the stack of plates in the filter press;

guides mounted on said vertical struts for guiding the vertical movement of said spray pipe;

said carrier frame further including a receiving tank at the underside of said carrier frame for collecting the spray water from said nozzles;

said receiving tank and carrier frame together being formed as a rectangular support;

a substantially vertical baffle suspended in a balanced relationship from each of said branched lines which is in alignment with the bores of the filter plate being washed, said baffle serving as a protective sheet to block washing liquid penetrating the bores of said plate and directing the blocked liquid into the receiving tank; and said baffles having their lower edges curved toward each other and being swivelable toward a horizontal plane when in abuting relation to the receiving tank.

2. A spray washing means as claimed in claim 1 including a driving motor mounted on said carrier frame and said generally vertical struts of the carrier frame being formed in a C profile open to the outside of said filter, the spray pipe being guided in the lateral portions of said C profile during up and down movement by said driving motor.

3. A filter press comprising:

vertical end posts;

horizontal I-guide carriers;

a stack of shiftable filter plates and a shiftable spray washing means carried by said horizontal I-guide carriers;

said spray means being adapted to simultaneously wash opposite sides of a filter plate which is taken from the stack by successively shifting the filter plates along said I-guide carriers;

said filter plates and said spray washing means being suspended from said horizontal I-guide carriers;

said spray washing means having a generally rectangular frame surrounding said I-guide carriers and said stack of filter plates for shiftable movement on the upper side of said I-guide carriers, said spray washing means having a spray pipe;

said spray pipe being formed with an inlet portion and a generally horizontal loop portion formed of two branched lines which are adapted to enclose a selected filter plate between said two branched lines;

nozzles in said loop portion in each of said two branched lines which face each other for simultaneously spraying opposite lateral surfaces of said filter plate under the same spraying pressure during spray washing by said pipe with water;

said frame including generally vertical struts on which said spray pipe is mounted for guided vertical movement into a position beneath the underside of the stack; and the base part of said rectangular frame forming a receiving tank collecting water dropping from the opposite sides of the filter plate during spray washing.

* * * * *